(12) United States Patent
Miller

(10) Patent No.: US 7,621,488 B2
(45) Date of Patent: Nov. 24, 2009

(54) ROTATING CUSHION FOR A TUBING CLAMP

(76) Inventor: Eugene Miller, 619 Driftwood Dr., Lake Milton, OH (US) 44429-9507

( * ) Notice: Subject to any disclaimer, the term of this patent is extended or adjusted under 35 U.S.C. 154(b) by 0 days.

(21) Appl. No.: 11/542,906

(22) Filed: Oct. 4, 2006

(65) Prior Publication Data

US 2007/0145198 A1   Jun. 28, 2007

(51) Int. Cl.
    *F16B 15/00*   (2006.01)
(52) U.S. Cl. ............ 248/71; 248/72; 248/74.1; 24/487
(58) Field of Classification Search ............... 248/68.1, 248/71, 72, 73, 74.1, 74.2, 316.5; 24/495, 24/496, 487 X
    See application file for complete search history.

(56) References Cited

U.S. PATENT DOCUMENTS

| | | | |
|---|---|---|---|
| 3,954,238 A | 5/1976 | Nivet | 248/68 |
| 4,240,604 A * | 12/1980 | Brach | 248/316.5 |
| 4,291,855 A | 9/1981 | Schenkel | 248/74 |
| 4,653,716 A * | 3/1987 | Sakaguchi | 248/316.5 |
| 4,662,590 A | 5/1987 | Hungerford, Jr. | 248/72 |
| 4,714,218 A | 12/1987 | Hungerford, Jr. | 248/62 |
| 4,728,071 A | 3/1988 | Salacuse | 248/316.5 |
| 4,802,646 A * | 2/1989 | Cattani | 248/316.5 |
| 4,934,635 A | 6/1990 | Sherman | 248/74.1 |
| 4,997,148 A | 3/1991 | Sherman | 248/74.1 |
| 5,013,166 A | 5/1991 | Domer | 384/220 |
| 5,014,940 A * | 5/1991 | Sherman | 248/74.1 |
| 5,094,578 A * | 3/1992 | Light et al. | 411/104 |
| 5,133,523 A | 7/1992 | Daigle | 248/62 |
| 5,251,857 A | 10/1993 | Grice | 248/62 |
| 5,494,245 A * | 2/1996 | Suzuki et al. | 248/74.1 |
| 5,624,217 A | 4/1997 | Hungerford, Jr. | 411/85 |
| 6,511,028 B1 | 1/2003 | Gretz | 248/222.52 |
| 6,604,725 B1 * | 8/2003 | Thullen et al. | 248/316.5 |
| 6,899,304 B2 * | 5/2005 | Bellmore et al. | 248/65 |
| 6,978,973 B1 * | 12/2005 | Gretz | 248/74.1 |

* cited by examiner

*Primary Examiner*—Korie Chan
(74) *Attorney, Agent, or Firm*—Robert G. Lev

(57) ABSTRACT

A pipe clamp cushion and a method for installing pipes and tube-like structures is provided by an polyester elastemer material that is independently connected to a support structure and has hinges molded as part of each arms of the clamp. The hinges are formed in a U-shaped arrangement, which does not compromise the material of the cushion, and thus allow the cushion arms to maintain strength and elastic properties. This arrangement permits easier installation for a wide variety of tube sizes and configurations.

8 Claims, 3 Drawing Sheets

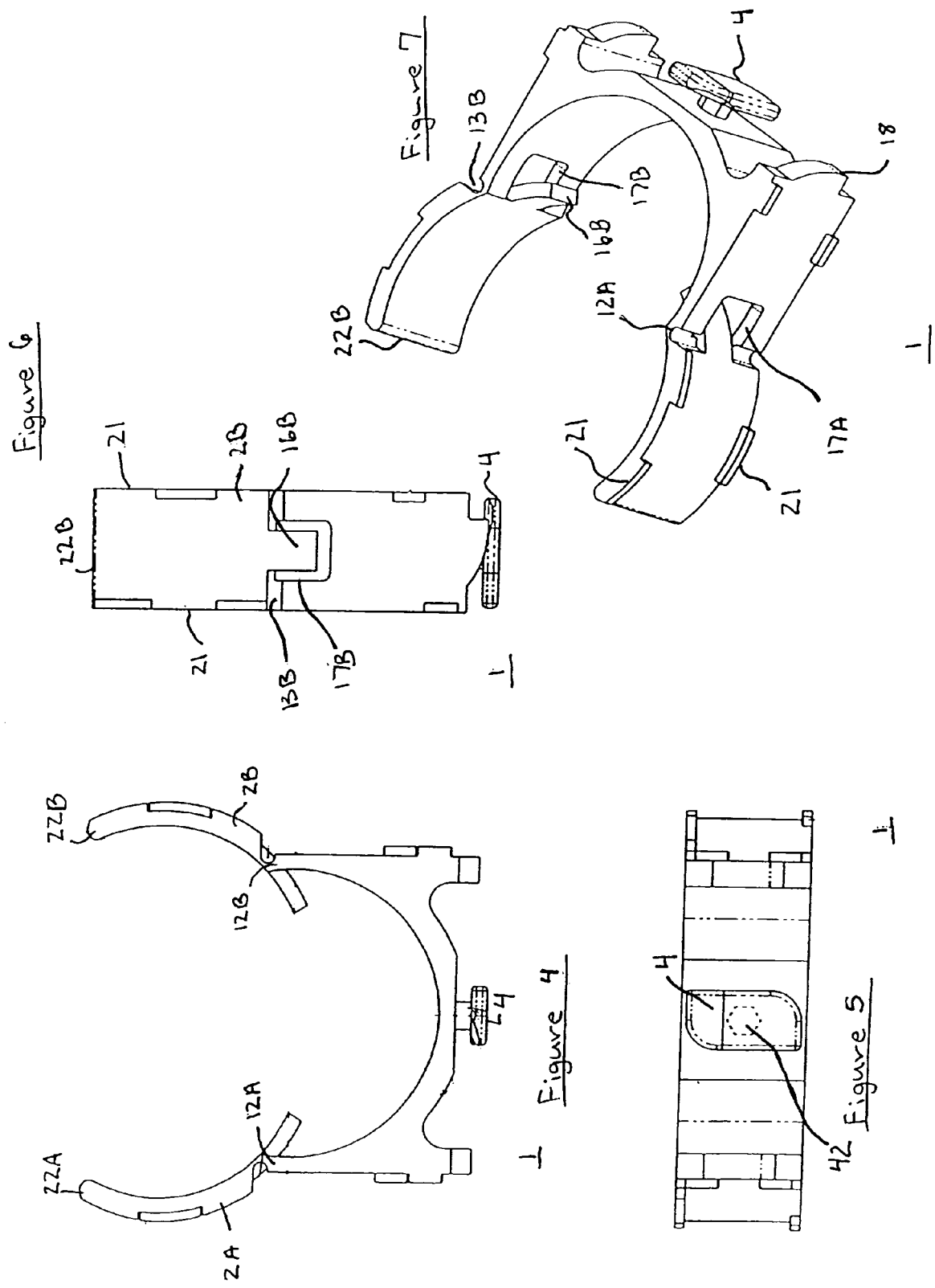

ROTATING CUSHION FOR A TUBING CLAMP

FIELD OF THE INVENTION

The present invention relates generally to clamping systems for securing elongated cylindrical members, such as pipes or tubes, in a manner to hold them firmly and to avoid transmittal of vibration. In particular, the present invention is directed to a system and a technique for more easily installing cushioned tube clamps.

BACKGROUND ART

Standard clamps for securing tubes, pipes, or other elongated structures are conventionally formed in two halves with an attachment for connecting the clamp to a support channel or stud, which is used to support the entire tube/clamp arrangement. The bottom of the clamp structure is connected to a support channel or stud in a variety of conventional manners. The top ends of the clamp are arranged to be attached to each other, and are conventionally held together using a screw/nut connection. One example of a typical arrangement is found in Appendix I, attached hereto, and incorporated herein by reference as a typical example of the conventional art.

A wide variety of arrangements for connecting the clamps to mounting supports or studs is known in the conventional art. Examples are found in the following U.S. Pat. No. 4,662,590; No. 4,714,218; No. 5,133,523; No. 6,511,028; No. 5,624,217; and No. 5,251,857, all incorporated herein by reference. Among these designs, are those in which a plate is used to interact with a channel-like support to hold the clamp (arranged around the tube or pipe) to the support channel. Such channels are like those manufactured and sold by Unistrut, an example of which is included in Appendix I.

Of particular interest to the present invention is the use of a cushion between the metal clamp structure and the pipe or tube-like structure to be held. Conventional examples of cushions are also found in Appendix I, and are incorporated herein by reference to facilitate understanding of the conventional art. The cushion is very important for achieving a tight fit without damaging either the tube or the clamp.

Generally the cushion is constituted by any elastomeric material. Examples are neoprene, polypropylene, silicon rubber and Styrofoam®. However, a wide variety of cushion materials have been used throughout the development of the conventional art. These include wood products, cloth products, and relatively soft metals. The selection of the cushion material very often depends upon the pipe or tubing material to be clamped, and the environment in which it is to be placed. The limitation of vibration, the size of the tube, and the required tightness of fit constitute major factors at work in the selection of both clamping and cushioning materials.

In many situations, the cushion must be made of a relatively dense and thus, relatively inelastic material. Such material is often very difficult to manipulate, especially when sized for smaller diameter tubes. Consequently, a large amount of force must be exerted to open such cushions and allow them to be arranged and fitted around the tube. If the cushion is sufficiently small and dense, manipulation becomes problematic. This makes installation far more difficult and time-consuming. Further, since cushions must be placed along the tube at multiple locations, the installation process becomes even more difficult. One example of such an arrangement is found is U.S. Pat. No. 4,516,296, incorporated herein by reference.

One method of making a hard plastic cushion easier to manipulate for installation purposes is found in U.S. Pat. No. 4,997,148, to Sherman, incorporated herein by reference. In order for the hard plastic cushion to be manipulated to fit around the tube during installation, a deep notch or groove is formed opposite the split between the two arms of the cushion. This groove permits the entire structure to flex so that the two arms can open up to the extent necessary to receive the tube. Then, a metal clamp is placed around the cushion in the conventional manner.

Unfortunately, the cushion is often weakened at the cut notch or groove by loss of material and/or the compromise of the material made by cutting. Depending upon the size of the cushion and the notch, the necessary manipulation of the two arms might be sufficiently violent so that the entire cushion structure is fractured or further degraded at the notch, and comes apart. Because, manipulation of the entire cushion is necessary in this particular configuration, more force is required to place the cushion around a pipe. Very often, this can be very awkward, thereby making the entire installation process more difficult and time-consuming, especially for small tubes.

There are a number of other arrangements also relying upon a deep notch or groove opposite the split between the cushion arms. These are found in U.S. Pat. No. 4,997,148; No. 5,013,166; and No. 4,728,071, all incorporated herein by reference. All share the aforementioned liabilities, attempting to balance ease of manipulation and maintenance of material integrity.

Other arrangements, such as that in U.S. Pat. No. 4,291,855, maintain a second permanent split between halves of the cushion. These can be easier to install, but might ultimately provide a less stable holding arrangement.

In the conventional arrangements depicted in Appendix I, the clamp holds the cushion within it, and is attached separately to the support channel. The cushion is held to the support channel only by means of the clamp. The cushion in turn merely surrounds the pipe or tube. Generally, the cushion is fit around the tube first. Then, the clamp has to be fit around the cushion and is attached to the support channel at the same time so that the entire arrangement is supported by the channel. The nature of the clamp is such that it does not effectively hold either the cushion or attach well to the channel until it is thoroughly tightened in its final position. This often leads to awkward, time-consuming installations, and has prompted a number of adaptations to provide solutions.

One such adaptation includes the use of a combination clamp and cushion as a single structure. U.S. Pat. No. 4,291,855, incorporated herein by reference, is an example of one such arrangement. Because the number of parts is reduced, installation is simplified. However, there are certain drawbacks with this particular design. For example, a snap-on lock is necessary rather than the more robust screwed/nut arrangement. Further, because only a single material is used, a wide range of either cushion materials or clamp materials is not available. In some situations, this is not a drawback. However, in other situations, this requirement imposes severe limitations. There may be a severe conflict between the strength and rigidity needed for the clamp material and the necessity of the vibration absorption provided by a softer cushion material.

The conventional art of pipe mounting clamps and cushions admits to a need for simplified installation while maintaining the benefits of a full range of materials for both clamps and cushions. Preferably, such an arrangement would include a pipe or tube clamp and that could hold a wide range of pipe sizes dedicated to virtually any application, under most conceivable circumstances. The arrangement would also permit a wide range of cushion materials so that a desired level of vibration control could be maintained. A simple, quick manipulation process would be sufficient for installation using the proposed system, and the cushion material would not be compromised.

SUMMARY OF THE PRESENT INVENTION

It is a first object of the present invention to provide a holding or clamping system for tube-like structures that overcomes the drawbacks of the conventional art.

It is another object of the present invention to provide a tube clamping system that is highly versatile, and can be configured for a wide range of pipes and tube sizes and types.

It is a further object of the present invention to provide a pipe clamping system that provides a very tight fit while minimizing the transmission of vibration.

It is an additional object of the present invention to provide a tube support system that is easy to install.

It is still another object of the present invention to provide a clamp assembly that can be used for fluid-carrying lines.

It is again a further object of the present invention to provide tube clamp cushion assembly that can fit around a wide variety of tube diameter sizes with a minimum of a physical exertion to conduct the fitting process.

It is yet an additional object of the present invention to provide a tube clamp cushion that can be operated without substantially degrading the material of the cushion.

It is again a further object of the present invention to provide a tube clamp cushion assembly that quickly and easily can be fitted to a supporting channel.

It is yet another object of the present invention to provide a tube clamp assembly that facilitates easy connection between the cushion and a supporting stud or channel.

These and other goals and objects of the present invention are provided by a tube clamp cushion for use with an external clamp to hold an external tube and arranged to operate in conjunction with an external support structure. The cushion includes two opposing arms forming an annular structure. Each of the opposing arms includes a hinge structure. Each of the hinge structures includes two regions of flexing material on either side of a U-shaped separation formed in the arm.

In another embodiment of the present invention, a tube clamp cushion is used with an external clamp to hold an external tube and arranged to operate in conjunction with an external support structure. The tube clamp cushion includes two opposing arms that are molded in an open position to receive the external tube.

A further embodiment includes a method of preparing a tube clamp cushion to receive an external tube to be held by an external support. The method includes the step of forming the tube clamp cushion with two opposing arms in an open position.

In still another embodiment of the present invention a method for mounting a tube clamp cushion is used. The tube clamp cushion includes an extended connecting plate to an external support having channels, and the tube clamp cushion is used to receive an external tube to be held. The method includes the steps of placing the connecting plate of the tube clamp cushion between the channels of the support structure. Then the entire tube clamp cushion is rotated so as to latch the connecting plate beneath the channels, thereby supporting the tube clamp cushion independent of any additional external devices.

BRIEF DESCRIPTION OF THE DRAWINGS

FIG. 4 is a front view depicting only the tube clamp cushion, including details of another embodiment of the present invention.

FIG. 5 is a bottom view depicting only the tube clamp cushion of another embodiment of the present invention.

FIG. 6 is a side view depicting only the tube clamp cushion of another embodiment of the present invention.

FIG. 7 is a perspective view of another embodiment of the tube clamp cushion of the present invention.

DETAILED DESCRIPTION OF THE PREFERRED EMBODIMENTS

Figure 1:
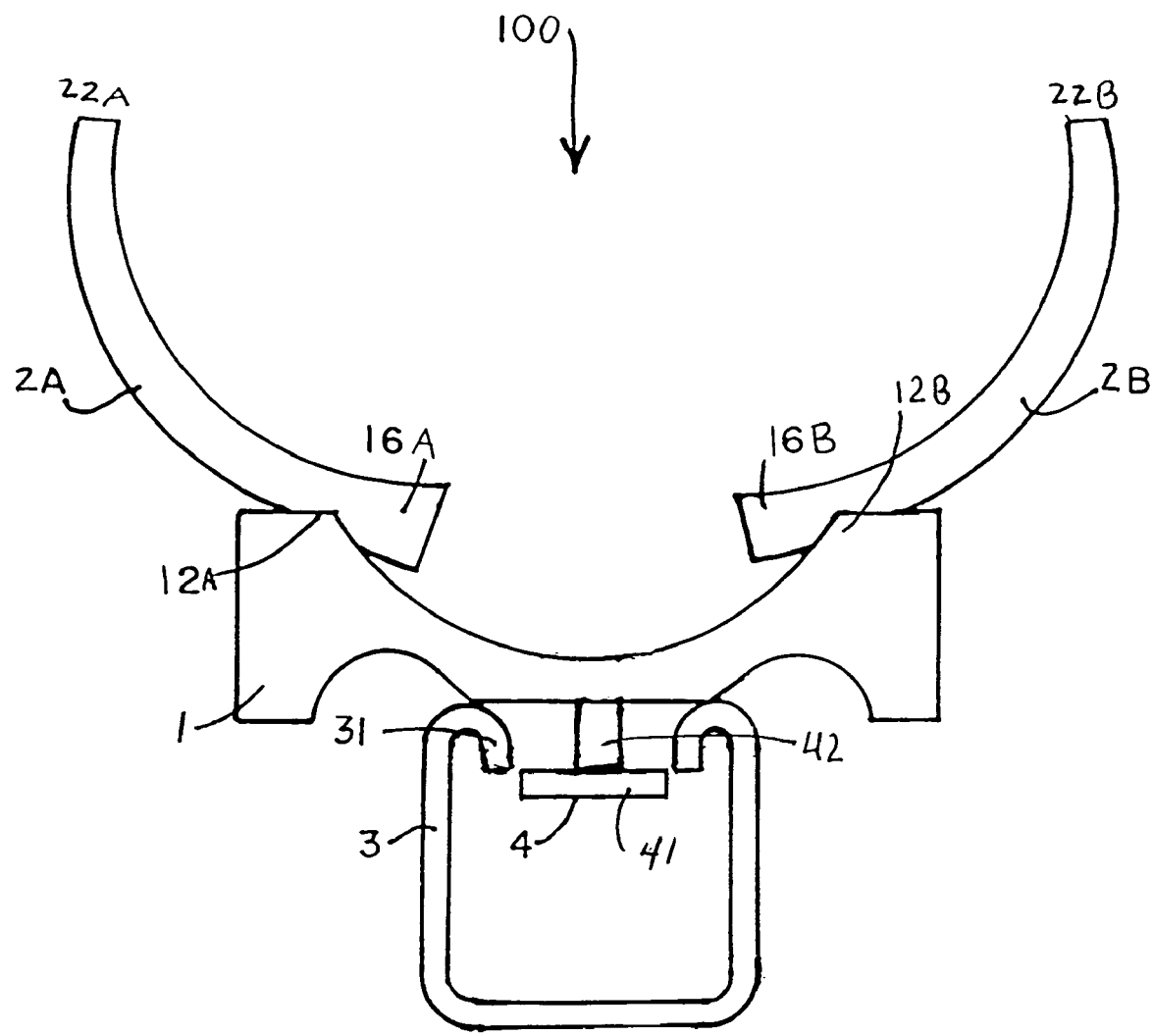
FIG. 1 is a front view of one embodiment of the tube clamp cushion of the present invention, connected to an external support channel.

FIG. 1 is a front view depicting a pipe clamp cushion 1 to hold a pipe or tube-like structure (not shown) to be assembled from direction 100. Also depicted in FIG. 1 is a support structure 3 (such as a stud or a channel) and a connector 4 for directly connecting cushion 1 to support structure or beam 3. Appendix II includes copies of photographs of the present invention within its environment, including associated structures.

A conventional clamp, which would be assembled around cushion 1 of the present invention and connected to a support structure, is not shown in FIGS. 1-7. Examples of such clamps are found in the many specimens of conventional art cited in this application and are depicted in Appendices I, II attached hereto. Consequently, further description or depiction of a clamp that can be used with the present invention is not considered necessary for a clear understanding of the present invention.

Pipe clamp cushion 1 is depicted in an initial installation position with respect to the support structure 3 in FIG. 1. The connector 4, which extends from clamp cushion 1, is placed in the support structure 3 from the bottom between channels 31. After rotating the cushion 90 degrees clockwise, the connector 4 is held by channels 31. The cushion 1 is properly configured with respect to the support structure 3 so that the cushion is in the final mounting position. As depicted in Appendix I, this is this same position that is necessary in the conventional art so that the tube extends perpendicular to the length of support structure or beam 3.

After cushion 1 is properly positioned in support structure 3, the cushion can receive the pipe or tube-like structure (not shown). The two halves of the conventional clamp (as depicted in Appendix II) are slid into either side of the support structure 3, and then joined together above the tube and clamp by means of a conventional bolt and nut arrangement. While the clamp (as depicted in Appendix II) is the primary device used to hold the tube-like structure (not shown) to support structure 3, a substantial additional amount of holding power is provided by the cushion 1 which is independently attached to support channel 3 by means of connector 4. This independent connection greatly facilitates the placement of the pipe or tube-like structure (not shown) within the open arms (2a, 2b) of tube clamp cushion 1. As a result, installation is much easier, and much less time-consuming.

There are many ways in which the clamp (not shown) can be attached in the configuration depicted in FIG. 1. These are already well known in the conventional art, and need not be elaborated upon, for an understanding of the present invention. It should be understood that the clamp (not shown) is an integral part of the overall pipe mounting system, just as the support structure 3 is an integral part of the overall environment in which the present invention is used. However, neither is new, and merely constitute the environment in which the inventive cushion 1 is used. The structure of cushion 1, and its direct connection to support structure 3 constitute the present invention.

It should be noted that one capability of the present invention is that the clamp (not shown) need not be firmly attached to support structure 3 in order for support to be provided to cushion 1.

Pipe clamp cushion 1 is formed in a semi circular shape with two split annular arms 2a, 2b. These annular arms have opposing ends 22a, 22b, and form a circular structure when the arms are closed by bringing opposing ends 22a, 22b together. As depicted in FIG. 1, the two opposing ends 22a, 22b are molded or formed in an open position to receive the pipe or tube (from direction 100). In the open position, rotating sections 16a, 16b of arms 2a, 2b, respectively, extend upwards from the curve of the arms of the cushion to receive the pipe or tube (not shown) being inserted, as indicated by designation 100 in FIG. 1.

As the pipe or tube is inserted between arms 2a, 2b, rotating sections 16a, 16b fold backward into the arms of the cushion 1, and opposing ends 22a, 22b are brought towards each other to form a virtually circular structure, thereby securing the tube (not shown). The weight of the tube or pipe, as well as its rigid nature, forces rotating sections 16a, 16b into the rest of arms 2a, 2b, respectively, further holding the opposing ends 22a, 22b towards each other. The result is a very secure arrangement that does not depend solely on the elasticity of the material constituting cushion 1.

Figure 2:
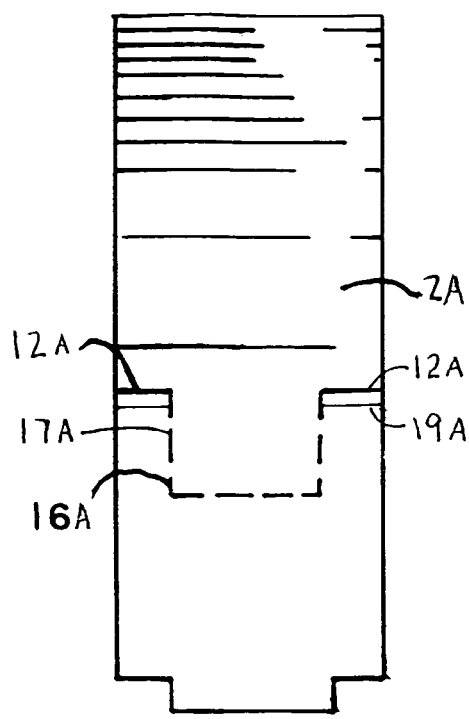
FIG. 2 is a side view of the tube clamp cushion of FIG. 1.

This functionality is enabled because of the construction depicted in FIG. 2. Each arm 2a, 2b is molded to have a U-shaped separation 17a, 17b, respectively to form rotating sections 16a, 16b. Because of this configuration, rotating sections 16a, 16b can be formed extending upwards from each of the arms 2a, 2b pivoting on hinges 12a, 12b, formed respectively in each arm at depressions 13a, 13b, respectively, at the tops of U-shaped separations 17a, 17b. The elastomeric properties of cushion 1 are not degraded because no material is cut, as is the case with many conventional grooves or notches. Accordingly, the hinges 12a, 12b maintain the full elastomeric properties of the material, but the operation of the cushion does not depend upon it.

The movement of rotating section 16a, 16b is facilitated by hinges 12a, 12b, which can be referred to as "living hinges" since they are constituted by the undegraded material of the cushion arm. In order to facilitate rotation without compressing the plastic cushion material, depressions 13a, 13b are formed behind each hinge 12a, 12b, respectively in the outward direction of movement of arms 2a, 2b, respectively. There is no cutting of the cushion material. Rather, the depressions 13a, 13b are simply formed as part of the original molding process. As a result, rotating sections 16a, 16b are able to be rotated easily into the U-shaped separations 17a, 17b, respectively. As a result, the receipt of the tube-like structure by clamp cushion 1 is facilitated with little effort on the part of the installer.

The spring-like action of the undegraded hinges 12a, 12b helps make installation easier since the arms 2a, 2b can be relied upon to flex easily for purposes of installing a tube or pipe. The rigid shape of the tube or pipe forces rotating sections 16a, 16b into the body of the arms 2a, 2b at the U-shaped separations 17a, 17b, facilitating rapid installation. Unlike the conventional notched or cut cushions, there is no chance that when manipulating the arms 2a, 2b, the entire structure will split or fail to return to required circular configuration. Also, because a relatively small amount of undegraded material forms the hinges 12a, 12b, and the arm ends 22a, 22b are formed in the open position, installation is relatively easy regardless of the size of the tube (not shown) to be held by cushion 1.

Because the material constituting cushion 1 is preferably one having particular elastomeric properties, the selection of a particular material can be important. One preferred material is the polyester elastomer designated as Hytrel®, manufactured by E. I. DuPont. Another acceptable material, a thermoplastic elastomer with the necessary properties for hinges (within the temperature range of −95 degrees F. to 300 degrees F.), is Sarlink®, produced by DSM Thermoplastic Elastemers, Inc. While these cushion materials have proven ideal in many applications, they are merely two examples of materials that can be used as a cushion for the present invention.

Once a pipe or tube-like structure is fit into cushion 1, the arms 2a, 2b will be held firmly in place by the elastomeric characteristics of hinges 12a, 12b and by the mass of the pipe itself. Further, arms 2a, 2b will be pressed tightly around the tube or pipe (not shown) by an external clamp (as shown in Appendix II) as is standard in conventional pipe clamping technology. Conventionally, cushion 1 and the tube (not shown) would be held to support 3 only by means of the external clamp. However, with the present invention, there is a separate and independent connection between support structure 3 and pipe clamp cushion 1. This facilitates ease of installation.

Normally, support structure 3 is in the form of an open beam having inward facing curved channels 31 on each face, with an open bottom and open ends. While this is a very common type of structure used for supporting pipes or tube-like devices, it is not the only type of support structure that can be used. Various examples of conventional support structures are found in Appendix I, attached hereto.

Figure 3:
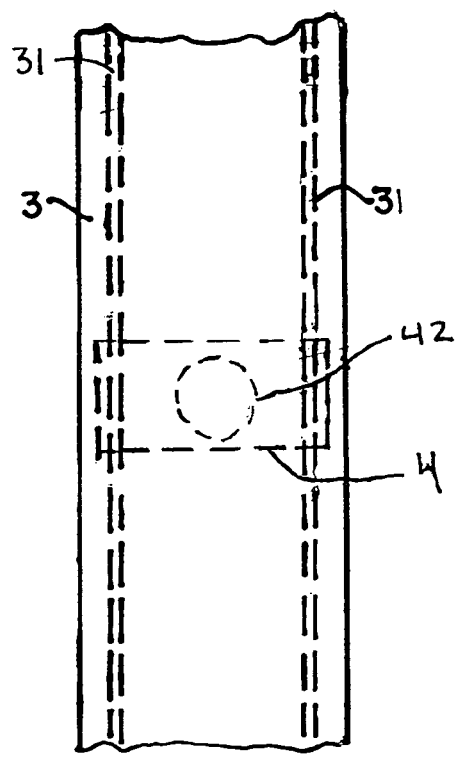
FIG. 3 is a bottom view of the support channel, depicting a connecting mechanism for holding the cushion to the support channel.

In the preferred embodiments of the present invention support structure 3 is a conventional beam as depicted in FIG. 1 and FIG. 3. Cushion 1 is held to support beam 3 by connecting device 4. Preferably, this includes a plate 41 having a thickness so that it can be held by the curved channels 31 of support channel 3. Connector 4 can be integrally formed as a plate 41 and an extension 42 which extends from the plate 41 through cushion 1. Connector 4 can be molded as an integral part of tube clamp cushion 1, and made of the same material. Connector 4 can also be formed or molded of a second material. In yet another alternative, connector 4 can be made separately and added to cushion 1, and can be made of metal or plastic.

Connector plate 41 is sized so that in one position it slips easily between curved channels 31 into support beam 3. The connector 4 (with the entire cushion 1) can then be rotated into a second position so that it slides under the curve channels 31 as depicted FIG. 3 and is held tightly within support beam 3 in the second position.

While a number of embodiments have been described by way of example, the present invention is not limited thereby. Rather, the present invention should be construed to encompass any and all variations, permutations, adaptations, derivations, modifications, and embodiments that would occur to one skilled in this art. Consequently, the present invention should be interpreted limited only by the following claims.

I claim

1. A tube clamp cushion for use with an external clamp to hold an external tube, and arranged to operate in conjunction with an external support structure, said cushion comprising:
    a) two opposing arms, each forming an annular structure;
    b) each said opposing arm comprising a hinge structure formed with a U-shaped cut providing an upwardly rotatable extension formed from said annular structure;
    c) each said hinge structure comprising two regions of flexing material on either side of said U-shaped cut formed in each said opposing arm.

2. The tube clamp cushion of claim 1, wherein said two opposing arms each has an opposing end and said opposing ends, and are configured to rotate toward each other on each of said hinge structures.

3. The tube clamp cushion of claim 2, wherein said regions of flexing material constitute "living hinges" of undegraded material.

4. The tube clamp cushion of claim 3, wherein each said hinge structure further comprises a depression behind said region of flexing material.

5. The tube clamp cushion of claim 1, wherein said tube clamp cushion comprises a polyester elastomer.

6. The tube clamp cushion of claim 5, wherein said cushion comprises a thermoplastic elastomer, operating within in a temperature range of substantially −95° F. to 300° F.

7. A tube clamp cushion of claim 1, wherein:
    d) said two opposing arms are molded in an open position to both simultaneously receive said external tube.

8. The tube clamp cushion of claim 7, wherein said tube clamp cushion is uncut.

* * * * *